United States Patent
Shum et al.

(10) Patent No.: US 9,311,238 B2
(45) Date of Patent: Apr. 12, 2016

(54) DEMOTE INSTRUCTION FOR RELINQUISHING CACHE LINE OWNERSHIP

(71) Applicant: International Business Machines Corporation, Armonk, NY (US)

(72) Inventors: Chung-Lung Kevin Shum, Wappingers Falls, NY (US); Kathryn Marie Jackson, Poughkeepsie, NY (US); Charles Franklin Webb, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/308,140

(22) Filed: Jun. 18, 2014

(65) Prior Publication Data

US 2014/0304471 A1 Oct. 9, 2014

Related U.S. Application Data

(60) Continuation of application No. 13/105,235, filed on May 11, 2011, now Pat. No. 8,880,805, which is a division of application No. 11/954,374, filed on Dec. 12, 2007, now Pat. No. 7,966,453.

(51) Int. Cl.
*G06F 12/08* (2006.01)

(52) U.S. Cl.
CPC ........ *G06F 12/0802* (2013.01); *G06F 12/0817* (2013.01); *G06F 12/0837* (2013.01); *G06F 2212/1016* (2013.01)

(58) Field of Classification Search
CPC .......................... G06F 12/0866; G06F 12/0871

USPC ................... 711/121, 141, 144, 145
See application file for complete search history.

(56) References Cited

U.S. PATENT DOCUMENTS

| | | | |
|---|---|---|---|
| 5,226,143 A * | 7/1993 | Baird et al. | 711/145 |
| 5,265,232 A | 11/1993 | Gannon et al. | |
| 5,678,026 A | 10/1997 | Vartti et al. | |
| 5,765,208 A | 6/1998 | Nelson et al. | |
| 6,128,706 A | 10/2000 | Bryg et al. | |
| 6,321,326 B1 | 11/2001 | Witt | |
| 6,560,693 B1 | 5/2003 | Puzak et al. | |
| 6,625,698 B2 | 9/2003 | Vartti | |
| 6,728,835 B1 | 4/2004 | Bauman et al. | |
| 6,801,986 B2 * | 10/2004 | Steely et al. | 711/141 |
| 6,981,102 B2 * | 12/2005 | Beardsley et al. | 711/141 |
| 7,155,588 B1 | 12/2006 | Jeter, Jr. | |

(Continued)

FOREIGN PATENT DOCUMENTS

WO WO 9923566 A1 * 5/1999 .......... G06F 12/0811

OTHER PUBLICATIONS

"Avoiding XI in Mp Systems Using Software Locks", IBM Technical Disclosure Bulletin, vol. 32, Issue 7, pp. 299-301,Dec. 1989.*
Peter Keleher, "Lazy Release Consistency for Dist ributed Shared Memory", Electrical and Computer Engineering, Houston Texas, Jan. 1995.*

(Continued)

*Primary Examiner* — Pierre-Michel Bataille
(74) *Attorney, Agent, or Firm* — John E. Campbell; Margaret A. McNamara

(57) ABSTRACT

A computer system microprocessor core having a cache subsystem executes a demote instruction to cause an exclusively owned demote instruction specified cache line owned by the same microprocessor core to be shared or read-only.

14 Claims, 3 Drawing Sheets

1. CPx SENDS EXCLUSIVE REQUEST FOR LINE A TO SC
2. SC1 REQUEST EXCLUSIVE FROM SC0
3. SC0 SENDS RELEASE EXCLUSIVE XI TO PROCESSOR CPy
4. CPy REMOVE ITS EXCLUSIVE OWNERSHIP IN ITS DIRECTORY
5. CPy ACKNOWLEDGES XI REQUEST TO SC0
6. SC0 REMOVE ITS TRACKING ON LINE A
7. SC0 INFORMS SC1 CPy GAVE UP EXCLUSIVE OWNERSHIP
8. SC1 UPDATE ITS DIRECTORY
9. CPx IS GRANTED WRITE (EXCLUSIVE) ACCESS TO LINE A
10. CPx UPDATE ITS DIRECTORY HAVING EXCLUSIVE OWNERSHIP

(56) References Cited

U.S. PATENT DOCUMENTS

| | | |
|---|---|---|
| 7,246,187 B1 | 7/2007 | Ezra et al. |
| 7,523,265 B2 * | 4/2009 | Dieffenderfer et al. ....... 711/141 |
| 7,620,954 B2 | 11/2009 | Mattina et al. |
| 8,122,195 B2 | 2/2012 | Greiner et al. |
| 2002/0174305 A1 | 11/2002 | Vartti |
| 2003/0009629 A1 | 1/2003 | Gruner et al. |
| 2003/0009641 A1 * | 1/2003 | Arimilli .............. G06F 12/0817 711/147 |
| 2003/0051113 A1 * | 3/2003 | Beardsley et al. ............ 711/163 |
| 2004/0015683 A1 | 1/2004 | Emma et al. |
| 2004/0073738 A1 | 4/2004 | Kessler et al. |
| 2004/0073773 A1 | 4/2004 | Demjanenko |
| 2004/0260885 A1 * | 12/2004 | Landin et al. ................. 711/144 |
| 2005/0160430 A1 | 7/2005 | Steely et al. |
| 2005/0188159 A1 | 8/2005 | Van Doren et al. |
| 2006/0149904 A1 | 7/2006 | Mowry |
| 2006/0161740 A1 | 7/2006 | Kottapalli et al. |
| 2009/0164758 A1 | 6/2009 | Haertel |

OTHER PUBLICATIONS

POU920070331US2 OfficeActions to Jun. 19, 2014.

Hill et al., "Cooperative Shared Memory: Software and Hardware for Scalable Multiprocessors." to appear in Proceedings of Fifth International Conference on Architectural Support for Programming Language and Operating Systems (ASPLOS V), Oct. 1992.

Keleher "Lazy Release Consistency for Distributed Shared Memory", Thesis, Rice University, Jan. 1995.

Anderson, "The Performance of Spin Lock Alternatives for Shared-Memory Multiprocessors,", IEEE Transactions on Parallel and Distributed Systems, v.1, n.1, pp. 6-16, Jan. 1990.

Hu et al "JIAJIA: A Software DSM System Based on a New Cache Coherence Protocol," HPCN Europr 1999, pp. 463-472, 1999.

U.S. Appl. No. 11/954,374 to Shum et al., filed Dec. 12, 2007, Office Action dated Sep. 29, 2010.

U.S. Appl. No. 11/954,374 to Shum et al., filed Dec. 12, 2007, Notice of Allowance dated Feb. 18, 2011.

* cited by examiner

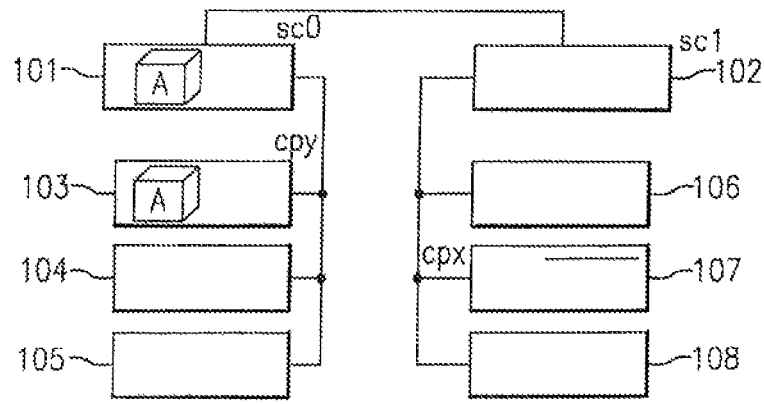

—LINE A EXISTS WRITE (EXCLUSIVE) IN A PROCESSOR CPy's CACHE

FIG.1

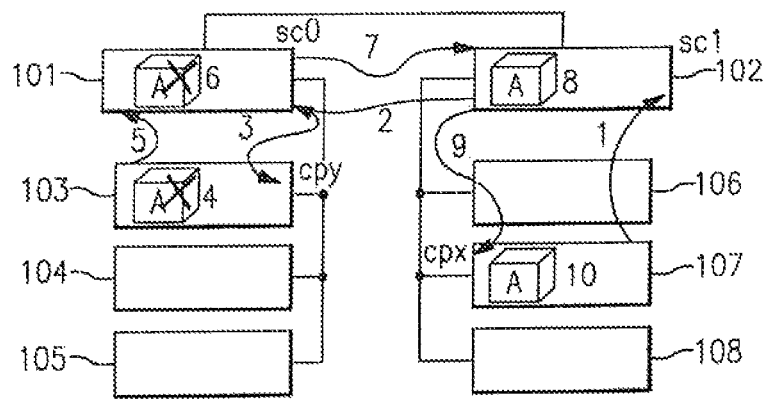

1. CPx SENDS EXCLUSIVE REQUEST FOR LINE A TO SC
2. SC1 REQUEST EXCLUSIVE FROM SC0
3. SC0 SENDS RELEASE EXCLUSIVE XI TO PROCESSOR CPy
4. CPy REMOVE ITS EXCLUSIVE OWNERSHIP IN ITS DIRECTORY
5. CPy ACKNOWLEDGES XI REQUEST TO SC0
6. SC0 REMOVE ITS TRACKING ON LINE A
7. SC0 INFORMS SC1 CPy GAVE UP EXCLUSIVE OWNERSHIP
8. SC1 UPDATE ITS DIRECTORY
9. CPx IS GRANTED WRITE (EXCLUSIVE) ACCESS TO LINE A
10. CPx UPDATE ITS DIRECTORY HAVING EXCLUSIVE OWNERSHIP

FIG.2

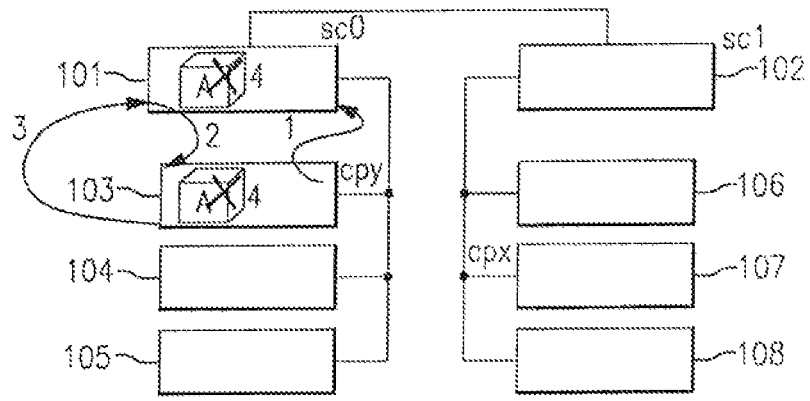

1. CPy SENDS DEMOTE REQUEST TO SC0
2. SC0 SENDS RELEASE EXCLUSIVE XI REQUEST TO PROCESSOR CPy
3. CPy UPDATE ITS DIRECTORY, ACKNOWLEDGE XI REQUEST
4. SC0 UPDATE DIRECTORY NOW EXCLUSIVE TO NO-ONE

FIG.3

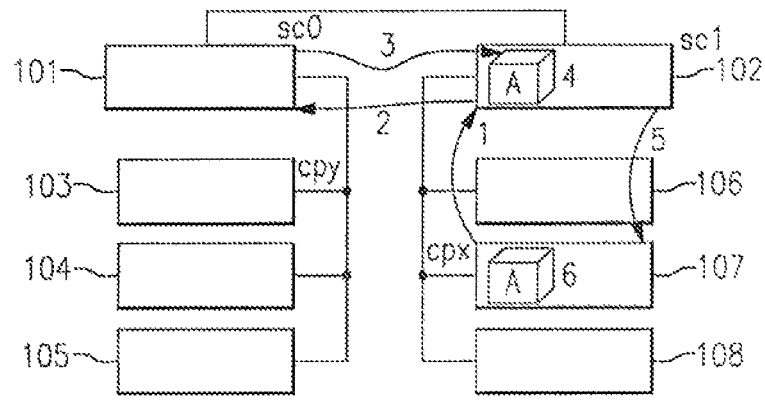

1. CPx SENDS STORE PRETEST TO SC1
2. SC1 REQUEST EXCLUSIVE OWNERSHIP FROM SC0
3. SC0 ACKNOWLEDGE AND REMOVE ITS TRACKING
4. SC1 UPDATE ITS DIRECTORY
5. CPx IS GRANTED WRITE (EXCLUSIVE) ACCESS TO LINE A
6. CPx UPDATE ITS DIRECTORY HAVING EXCLUSIVE OWNERSHIP

FIG.4

1. CPy SENDS DEMOTE REQUEST TO L2y
2. L2y SENDS DEMOTE CROSS INTERROGATE XI TO CPy
3. CPy ACKNOWLEDGES XI AND UPDATE ITS DIRECTORY
4. L2y UPDATES DIRECTORY TO NO EXCLUSIVE RIGHTS
5. L2y SEND DEMOTE UPDATE REQUEST TO SC0
6. SC0 UPDATE ITS DIRECTORY FOR EXCLUSIVE TO "NO-ONE"

DEMOTE INSTRUCTION FOR RELINQUISHING CACHE LINE OWNERSHIP

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer systems and in particular to systems with cache subsystems wherein demote requests are performed by the cache subsystem and which allows software to indicate to hardware that it should alter its cache state.

2. Description of Background

In a multiprocessing system where consistent memory usage model is required, memory usage among different processors is managed using cache coherency ownership schemes. These schemes usually involve various ownership states for a cache line. These states include read-only (or commonly known as shared), and exclusive (where a certain processor has the sole and explicit update rights to the cache line, sometimes known as store access).

For one such protocol used for a strongly-ordered memory consistency model, as in IBM's z/Architecture implemented by IBM System z processors, when a processor is requesting rights to update a line, e.g. when it is executing a "Store" instruction, it will check its local cache (L1) for the line's ownership state. If the processor finds out that the line is either currently shared or is not in its cache at all, it will then send an "exclusive ownership request" to the storage controller (SC) which serves as a central coherency manager.

The storage controller (SC) tracks which processor, if any, currently owns a line exclusively. If deemed necessary, the storage controller (SC) will then send a "cross interrogate" (XI) or "ownership change" request to another processor which currently owns that line to release its exclusive rights. Once the current owning processor has responded to the XI and responded that the exclusive ownership is released, the requesting processor will then be given exclusive update rights to the line requested.

In a large SMP (Symmetric Multi-Processing) system, it is common that various processes running on different processors update the same cache lines, but at different times. When a line is updated by one process, and then another process starts up, updating the same line by that other process will encounter delays required for XI acknowledgement while exchanging exclusive ownerships from one processor to another. These delays amount to a large performance degradation as number of processes goes up that reuse the same cache lines.

SUMMARY OF THE INVENTION

The shortcomings of the prior art are overcome and additional advantages are provided through the provision of a new instruction or instruction variation that allows software to indicate to hardware that its storage modification to a particular cache line is done, and will not be doing any modification for the time being This invention, which allows software to indicate to hardware that its storage modification to a particular cache line is done and will not be doing any modification for the time being, allows the system to alter its cache state. With this indication, the processor can then actively release its exclusive ownership by updating its line ownership from exclusive to read-only (or shared) in its own cache directory and in the storage controller (SC). By actively giving up its exclusive rights, the first processor allows another processor to immediately be given exclusive ownership to that cache line without waiting on any processor's explicit cross invalidate acknowledgement. This invention provides a hardware design needed to provide this support.

After receiving such indication, a microprocessor can actively relinquish its exclusive ownership to a cache line, and preemptively update the ownership status in the storage controller to "shared", thus removing delays due to XIs that would have otherwise been encountered by another processor should that processor request an exclusive ownership to the cache line.

The actual microprocessor implementation involves processing the instruction, and a new interface to communicate the "demote" request to the storage controller. It is also important to provide necessary interlock to prevent a premature launch of the "demote" request. For use in a microprocessor design with a direct connection to the storage controller, all prior committed storage update must be done prior to the actual demote status update in both directories of the requesting processor and storage, but not necessarily before a demote request is launched. For use in a microprocessor design with a private L2, an alternative design is described to ensure all prior committed storage updates are sent and are received in the storage controller before the "demote" request is sent.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which reduces the overhead of cache line sharing by multiple processes across a large SMP system that contains writeable data. The overall system wide performance can then be improved.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an initial state X where processor CPy owns line A exclusively;

FIG. 2 illustrates what happens when processor CPx needs line A exclusively after an initial state X;

FIG. 3 illustrates CPy executes a demote to line A after an initial state X;

FIG. 4 illustrates what happens when processor CPx needs line A exclusively after the demote process;

Figure 5:
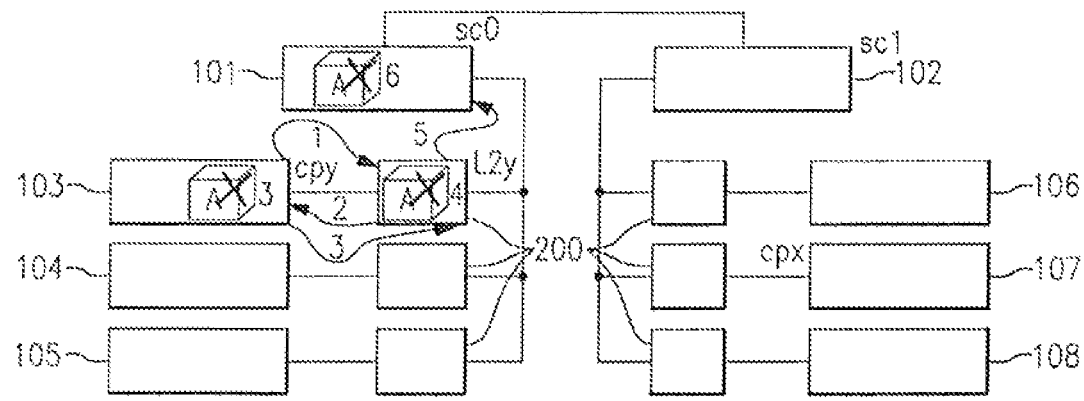
FIG. 5 illustrates a demote process for a different system design having private L2 cache.

The detailed description explains the preferred embodiments of the invention, together with advantages and features, by way of example with reference to the drawings.

DETAILED DESCRIPTION OF THE INVENTION

To allow software to indicate to the hardware a cache line is no longer required for further storage update, an instruction can be provided, with a way to indicate the logical address, as suited to a specific architecture. This is done with a new opcode or a new variation of an existing cache management instruction using unused fields or code-points. Specific instructions which implement this invention are expected to be used in device drivers, operating system code or any application that uses common parameter blocks or semaphore blocks.

The intention of this provision is that the software code will treat this as a "done with store to this line" instruction, now simply called "demote instruction", at the end of its last storage updating instruction. It should be used for lines that contain highly utilized data across various processes that are executing in different processors and most likely at different times.

One typical software example may be on the management of a cache line that contains various semaphore locks needed for multiprocessor handling. The effect of the software using this provision will be to obtain or release a software lock managed in a cache line, and then demote the line actively. By releasing the line actively, other processes can proceed more quickly to either obtain or release the same lock or other locks managed within the same cache line.

An important thing is that the software application knows that this is the last point of update until some period of time later. If the software requires an update to the line soon after a "demote", it would instead be bad for performance, since then the processor will take time to regain the exclusive rights.

Let's describe how this instruction is implemented in computer system with a cache hierarchy as illustrated in FIG. 1. This figure, and subsequent FIGS. 2-5, illustrates a bi-nodal system where the Storage Controller (SC) is made up of 2 different physical node controllers SC0 101 and SC1 102, each having 3 processors 103-105 or 106-108 attached.

FIG. 1 indicates a typical initial state where processor 103 (CPy) already owns the exclusive rights to a cache line A. FIG. 2 illustrates that when processor 107 (CPx) requests to have exclusive rights to same cache line A, (e.g. when it is executing a "Store" instruction and needs store access) while processing a storage update instruction, the wait on getting a confirmation on the cross interrogate (XI) from the current owning processor 103 (CPy) delays this requesting processor 107 (CPx) from being able to start any storage update to the line A. The steps 1-10 are shown in FIG. 2.

With the provision of a "demote" instruction, instead of having to take up the delay on the XI acknowledgement, the SCs 101 or 102 would have already updated its directory to show that no processor is currently owning the line exclusively, and thus can return the line A exclusively to processor 107 CPx when processor 107 CPx requests for it in a very timely manner. This is shown in FIGS. 3 and 4.

In FIG. 3, when the application running on processor 103 CPy decides to "demote" the cache line, processor 103 CPy will send a request to SC0 101 to demote line A (1). (There will be a decoding and execution of a program instruction calling for such a demotion) Once the demote request is received, the SC0 101 will process the request as if a "non-existing" processor is requesting line A exclusively. It will start up the lookup in its directory, send a cross interrogate to processor 103 CPy to request a release on exclusive rights (2). If processor 103 CPy still have storage update to that line pending in its pipeline, it can reject the cross interrogate. The SC0 101 will in turn repeat the cross interrogate until pending stores in processor 103 CPy are drained. When there is no pending stores for line A existing in processor 103 CPy, processor 103 CPy at this time should naturally be accepting the release request. Processor 103 CPy will update its directory with no more exclusive rights and send back an acknowledgement to SC0 101 (3). Once the acknowledgement is received, the SC0 101 will update its directory update to indicate that line A is now exclusive to "no one" (4). The software demote process is thus accomplished. This state of exclusive to no one is equivalent to a shared (or read-only) state with respect to how if affect exclusive XI activities concerning this line.

Now, as seen in FIG. 4, if another processor 107 CPx requests line A exclusively (1), the SC1 102 can quickly request the line exclusively from SC0 101 (2-4), and then reply to the requesting processor 107 CPx with an exclusive response (5-6) without acquiring any delay for cross interrogation towards processor 103 CPy. This reduction of delay could be even more apparent in a system if the Storage Controllers for nodes 101, 102 are on a different chip(s) than the processors, where the cross-chip communication is now removed.

To further describe a variant implementation of this demote instruction, we will illustrate with a system where there is one private Level 2 cache (L2) per processor. This is shown in FIG. 5. Each processor 103-108 in this system has a private L2 200.

In this design, when processor 103 CPy sends a demote request to its private L2 200 L2y (1), the L2 will lookup its directory, and then send a release exclusive cross interrogate back into the processor 103 CPy (2). If the Load Store Unit (LSU) inside the processor 103 CPy still has storage update to that line pending in its pipeline, it can reject the cross interrogate. The L2 200 L2y will in turn repeat the cross interrogate until pending stores in processor 103 CPy are drained. When there is no pending stores for line A, the LSU inside the processor 103 CPy will process the interrogate request, remove its directory status of exclusive ownership, and acknowledge to L2 200 L2y that this is done (3).

This private L2 200 L2y will drain any pending store to this line A, then also update its directory to indicate no exclusive ownership (4), and send a demote request to the SC0 101 (5). Upon receiving the demote request, SC0 101 will update its directory to indicate the line A is now exclusive to "no one" (6). With this illustration, it will be appreciated that this function can be implemented with various systems having a different cache hierarchy or topology than that illustrated. Because these can be implemented by those skilled in the art after learning of this teaching, all their variants are not specifically shown.

Figure 6:
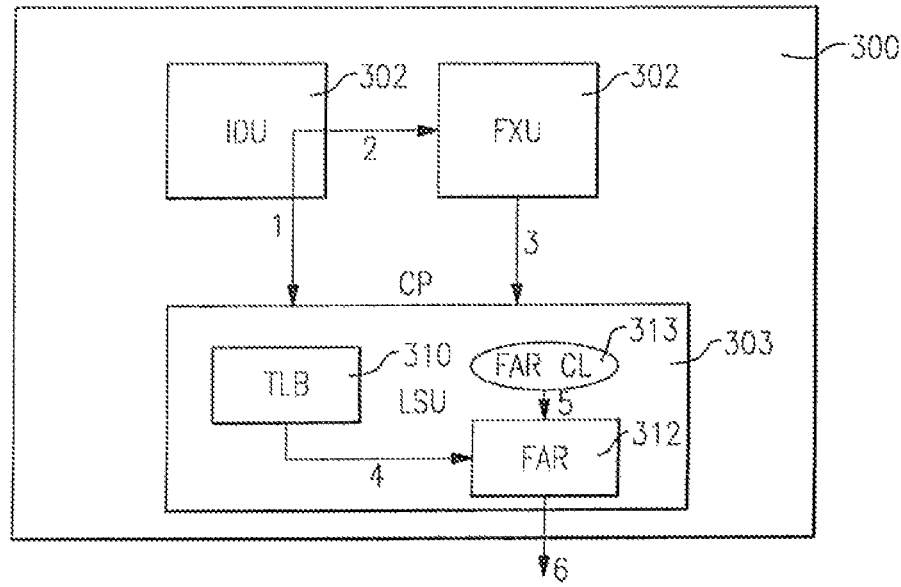
FIG. 6 illustrates a typical processor that is executing the demote instruction.

FIG. 6 illustrates how such an instruction is processed within a microprocessor core. For this description, only 3 of the key units IDU 301 (Instruction Dispatch Unit), FXU 302 (Fixed Point Unit), and LSU 303 (Load Store Unit) are depicted as part of the microprocessor CP 300.

During hardware execution of this instruction, the microprocessor pipeline will execute this instruction as a one cycle superscalar instruction that performs no architectural updates. All the work is to be performed by the cache subsystem.

For an in-order microprocessor CP 300, when the "demote instruction" is dispatched from the instruction dispatch unit IDU 301, the logical address calculated according to the instruction format and a decode of such instruction indicating a demote operation will be sent from IDU 301 to LSU 303 (arrow 1). In parallel, IDU 301 will send the opcode to FXU 302 (arrow 2) which will complete the instruction if this is the next to complete without waiting for any acknowledgement or doing any architectural update.

LSU 303 will obtain the absolute address used in cache management by either looking up the address translation of the logical address sent from IDU 301 in its translation lookaside buffer (TLB) 310, or obtain a translation result through a dynamic translation process. Once the absolute address is obtained (arrow 4), it will arm the absolute address and a demote command in one of its available Fetch Address Register (FAR) 312. The demote command will be a predefined interface value on the request bus (arrow 6) to the Storage Controller (SC) indicating a "demote" is to be performed.

The LSU's 303 control logic 313 will hold on to the demote request, and wait until all prior instructions complete before it send the demote request and address to the SC (arrow 6). This is done by monitoring pipeline flushing interface from the FXU 302 which controls instruction completion in this example. It is important that the demote request is not sent under an incorrectly predicted branch path, or if any older instruction does not successfully complete due to processor pipeline flushing conditions. Otherwise, an unnecessary performance penalty may be incurred.

In an out of order microprocessor, due to the nature of the design, the actual launch of the demote request from the LSU makes use of a tag. To fit into an out of order design, the demote request sitting in the FAR register is tagged with an instruction ID, and only launched when the global completion logic determines that this instruction ID is being completed.

An alternative design, not specifically shown in FIG. 5 but illustrated thereby, will have the demote request be written into a store queue entry (instead of a FAR register entry) at 312. By doing so, since stores have to be completed and processed in order for machines requiring a strongly-ordered memory model, the store queue logic at 312 will tagged its entries with instruction IDs and receive instruction completion ordering from the global completion logic. The store queue logic can then precisely send the demote request (through the FAR logic) without being premature. Additionally, any pending stores prior to the demote instruction will naturally be drained out of its pipeline before a demote request is sent. This helps in reducing the chance that the LSU needs to reject the demote cross interrogate when sent by the storage controller, or a private L2 if installed.

As illustrated, the present invention can help improve system performance by carefully inserting "demote" instructions in software code, with a hardware provision of such mechanism. It requires thoughtful implementation in software, firmware, together with hardware to be effective.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for relinquishing cache ownership of a cache line, the method comprising executing, by a selected processor of a multi-processor system, a demote instruction, the demote instruction specifying a logical address, the multi-processor system comprising a multi-cache system and a cache coherency ownership scheme for providing any one of shared ownership and exclusive ownership of a cache line to caches of the multi-processor system, an exclusively owned cache line configured to be accessible, by a processor, in only one cache of the multi-cache system, the only one cache having the exclusively owned cache line, a shared ownership cache line configured to be accessible, by processors, in a plurality of caches of the multi-cache system, the plurality of caches having the shared ownership cache line, the executing the demote instruction performing a method comprising:

based on the specified logical address, determining whether a cache line of the cache system, is exclusively owned by a selected cache of the selected processor;

based on determining that the cache line is exclusively owned by the selected cache of the selected processor, relinquishing, by the selected cache, exclusive ownership of the cache line; and based on executing the demote instruction, the selected processor completes all pending stores before relinquishing the exclusive ownership of the cache line, wherein the relinquishing the exclusive ownership of the cache line comprises setting the ownership of the cache line of the selected cache to any one of shared ownership or read-only allowing a processor of the multiprocessor system to immediately be given exclusive ownership to that cache line without waiting on any processor's explicit cross invalidate acknowledgement, and wherein execution of the demote instruction performs no architectural update.

2. The method according to claim 1, further comprising translating the logical address to a cache address.

3. The method according to claim 2, wherein the cache address is an absolute address.

4. The method according to claim 2, wherein the selected processor is an out-of-order processor.

5. The method according to claim 1, wherein the caches of the multi-cache system consist of a plurality of private caches, wherein each processor of the multi-processor system comprises an associated private cache of the multi-cache system, wherein the selected cache is a selected private cache, wherein the determining is performed on the selected private cache associated with the selected processor.

6. The method according to claim 1, further comprising:

prior to the executing the demote instruction, obtaining, by the selected cache, ownership of the cache line in a private cache of the selected processor from a private cache of another processor of the multi-processor system.

7. The method according to claim 1, wherein the relinquishing, by the selected processor, exclusive ownership of the cache line, causes the cache line to be in a shared ownership state in a private cache of the selected processor, the method further comprising:

subsequent to the executing the demote instruction, obtaining shared ownership of the cache line by another private cache of the multiprocessor system.

8. The method according to claim 1, wherein the demote instruction is an instruction of any one of an operating system, a device driver or an application that uses common blocks.

9. A system for relinquishing cache ownership of a cache line, the system comprising:
a selected private cache; and
a selected processor of a multi-processor system, the selected processor communicatively coupled to said selected private cache, each processor of the multi-processor system comprising an associated private cache of a multi-cache system, the multi-cache system comprising a cache coherency ownership scheme configured to provide any one of shared ownership and exclusive ownership of a cache line to private caches of the multi-cache system, an exclusively owned cache line configured to be accessible, by a processor, in only one cache of the multi-cache system, the only one cache having the exclusively owned cache line, a shared ownership cache line configured to be accessible, by processors, in a plurality of caches of the multi-cache system, the plurality of caches having the shared ownership cache line, the selected processor configured to perform a method, the method comprising executing, by the selected processor of a multi-processor system, a demote instruction, the demote instruction specifying a logical address, the executing the demote instruction performing a method comprising:
based on the specified logical address, determining whether a cache line of the selected private cache, is exclusively owned by the selected private cache of the selected processor;
based on determining that the cache line is exclusively owned by the selected private cache, relinquishing, by the selected private cache, exclusive ownership of the cache line; and
based on executing the demote instruction, the selected processor completes all pending stores before relinquishing the exclusive ownership of the cache line, wherein the relinquishing the exclusive ownership of the cache line comprises setting the ownership of the cache line of the selected cache to any one of shared ownership or read-only allowing a processor of the multiprocessor system to immediately be given exclusive ownership to that cache line without waiting on any processor's explicit cross invalidate acknowledgement, and wherein execution of the demote instruction performs no architectural update.

10. The system according to claim 9, further comprising translating the logical address to a cache address.

11. The system according to claim 10, wherein the cache address is an absolute address.

12. The system according to claim 10, wherein the selected processor is an out-of-order processor.

13. The system according to claim 9, further comprising:
prior to the executing the demote instruction, obtaining by the selected processor, ownership of the cache line in the private cache of the selected processor from a private cache of another processor of the multi-processor system.

14. The system according to claim 9, wherein the relinquishing, by the selected processor, exclusive ownership of the cache line, causes the cache line to be in a shared ownership state in the selected private cache of the selected processor, the method further comprising:
subsequent to the executing the demote instruction, obtaining shared ownership of the cache line by another private cache of the multiprocessor system.

* * * * *